(12) United States Patent
Jiang

(10) Patent No.: US 11,157,445 B2
(45) Date of Patent: Oct. 26, 2021

(54) INDEXING IMPLEMENTING METHOD AND SYSTEM IN FILE STORAGE

(71) Applicant: TENCENT TECHNOLOGY (SHENZHEN) COMPANY LIMITED, Guangdong (CN)

(72) Inventor: Wenhan Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 494 days.

(21) Appl. No.: 15/813,603

(22) Filed: Nov. 15, 2017

(65) Prior Publication Data

US 2018/0075050 A1   Mar. 15, 2018

Related U.S. Application Data

(63) Continuation of application No. PCT/CN2016/103699, filed on Oct. 28, 2016.

(30) Foreign Application Priority Data

Nov. 4, 2015   (CN) .......................... 201510741056.7

(51) Int. Cl.
G06F 16/10   (2019.01)
G06F 16/13   (2019.01)
G06F 16/14   (2019.01)

(52) U.S. Cl.
CPC .......... *G06F 16/134* (2019.01); *G06F 16/148* (2019.01)

(58) Field of Classification Search
None
See application file for complete search history.

(56) References Cited

U.S. PATENT DOCUMENTS 9,529,808 B1 * 12/2016 Sudarsanam ....... G06F 11/1464
2008/0172422 A1    7/2008 Li et al.
2015/0169602 A1 *  6/2015 Shankar ................ G06F 16/907
                                                        707/825

FOREIGN PATENT DOCUMENTS

CN       101655858 A       2/2010
CN       102693308 A       9/2012
(Continued)

OTHER PUBLICATIONS

International Search Report with Translation for International Application No. PCT/CN2016/103699 dated Jan. 26, 2017.
(Continued)

*Primary Examiner* — Kristopher Andersen
(74) *Attorney, Agent, or Firm* — Morgan, Lewis & Bockius LLP

(57) ABSTRACT

Embodiments of the present disclosure provide an indexing implementing method in file storage, and the method includes: obtaining an index operation request of a file; searching an increment interval to determine whether the increment interval stores at least one piece of metadata corresponding to the file, making a response to the index operation request according to the at least one piece of metadata in the increment interval when the increment interval stores the at least one piece of metadata corresponding to the file, and processing the index operation request according to a total quality interval corresponding to the increment interval when the increment interval does not store the at least one piece of metadata corresponding to the file; wherein each piece of metadata comprises an index corresponding to the file. Further, an indexing implementing system in file storage is provided.

16 Claims, 11 Drawing Sheets

(56) References Cited

FOREIGN PATENT DOCUMENTS

| CN | 103177117 A | 6/2013 |
|----|-------------|--------|
| JP | H 01-98020 A | 4/1989 |
| JP | 2012-128640 A | 7/2012 |

OTHER PUBLICATIONS

Office Action with Translation Issued for Japanese Patent Application No. 2017-562725 dated Nov. 13, 2018.
International Preliminary Report on Patentability for International Application No. PCT/CN2016/103699 dated May 8, 2018.

* cited by examiner

INDEXING IMPLEMENTING METHOD AND SYSTEM IN FILE STORAGE

CROSS-REFERENCE TO RELATED APPLICATIONS

This application is a continuation of International Application No. PCT/CN2016/103699, filed on Oct. 28, 2016, which further claims the benefit and priority of Chinese Application No. 201510741056.7, filed on Nov. 4, 2015, and entitled "An indexing implementing method and system in file storage". The entire disclosures of each of the above applications are incorporated herein by reference.

FIELD

The present disclosure relates to a computer application technology field, and more particularly to an indexing implementing method and system in file storage.

BACKGROUND

The storage of massive files may be implemented via a distributed storage cluster and a related data center may be set for this distributed storage cluster to store indexes, which may be used to implement file read and write services, in the data center.

The storage location of each file in the distributed storage cluster may be maintained via the data center and the setting of the indexes. At present, the most popular mode is managing the indexes via storing file Identifiers (ID)s and storage locations thereof in the data center to maintain the storage location of each file and make a response to a file reading or writing request.

Specifically, suppose that the file ID may be Key and a mapping relationship between the Key and a storage location may be stored in a segment using the index. However, in order to stratify requirements of massive storage, the segment may include a relative large Key scope, resulting in that a single segment may store too many indexes and the operating performance corresponding to the indexes maybe significantly reduced.

SUMMARY

An embodiment of the present disclosure may provide an indexing implementing method in file storage, which may satisfy requirements of massive storage and significantly improve the operation performance of the indexes.

An embodiment of the present disclosure may provide an indexing implementing system in file storage, which may satisfy requirements of massive storage and significantly improve the operation performance of the indexes.

An indexing implementing method in file storage includes:

obtaining an index operation request of a file;

searching an increment interval to determine whether the increment interval stores at least one piece of metadata corresponding to the file, making a response to the index operation request according to the at least one piece of metadata in the increment interval when the increment interval stores the at least one piece of metadata corresponding to the file, and processing the index operation request according to a total quality interval corresponding to the increment interval when the increment interval does not store the at least one piece of metadata corresponding to the file;

wherein each piece of metadata comprises an index corresponding to the file.

An index implementing system in file storage comprising: a processor, which executes modules in a storage, wherein the modules include:

a request obtaining module, executed by the processor to obtain an index operation request of a file;

an increment searching module, executed by the processor to search an increment interval to determine whether the increment interval stores at least one piece of metadata corresponding to the file, notify an increment response module when the increment interval stores the at least one piece of metadata corresponding to the file, and notify a total quality response module when the increment interval does not store metadata corresponding to the file;

the increment response module is executed by the processor to make a response to the index operation request according to the at least one piece of metadata in the increment interval;

the total quality response module is executed by the processor to process the index operation request according to a total quality interval corresponding to the increment interval;

wherein each piece of metadata comprises an index corresponding to the file.

It can be seen from the above technical scheme that with regard to the index operation request of any file, an increment interval may be searched to determine whether the increment interval stores at least one piece of metadata corresponding to the file. When the at least one piece of metadata corresponding to the file is found from the increment interval, the metadata includes the index corresponding to the file and a response to the index operation request may be made according to the metadata in the increment interval. When no metadata corresponding to the file is found from the increment interval, the index operation request may be processed according to the corresponding total quantity interval. The storage of massive files may be implemented with the cooperation of the increment interval and the corresponding total quantity interval, the reading and writing performance of the data storage interval may be improved and the operation performance of the indexes may be further improved.

DETAILED DESCRIPTION

DETAILED DESCRIPTION

Embodiments embodying features and merits of the present disclosure may be described in detail in following description. It is not intended to be exhaustive or to limit the disclosure. Embodiments of the present disclosure may be varied in many ways without departing from the scope of the present disclosure. The description and figures are used to describe the present disclosure and are not used to limit the present disclosure.

The distributed storage may include two index management modes. The first type may be managing indexes using a consistent hashing mode, instead of the data center. The other type may be managing the indexes using the data center to store the file IDs and storage locations thereof.

No matter which mode is adopted, with regard to the storage of the massive files, massive ever-expanding indexes may need to be maintained in time.

However, with the existing massive indexes, the operating performance may be determined by delay of index query. In the existing index management mode, since a large amount of data is searched, so the operating performance cannot be improved. Therefore, the implementation of indexes in the file storage should be optimized.

Embodiments of the present disclosure may provide an index implementing method in file storage, to improve the performance of processing of various index operations.

The index implementing method in the file storage may be implemented by computer programs. Accordingly, the index implementing system in the constructed file storage may be stored in servers or server clusters to run processes for implementing various index operations and implement adding, deletion, searching and modification operations of the indexes.

Figure 1:
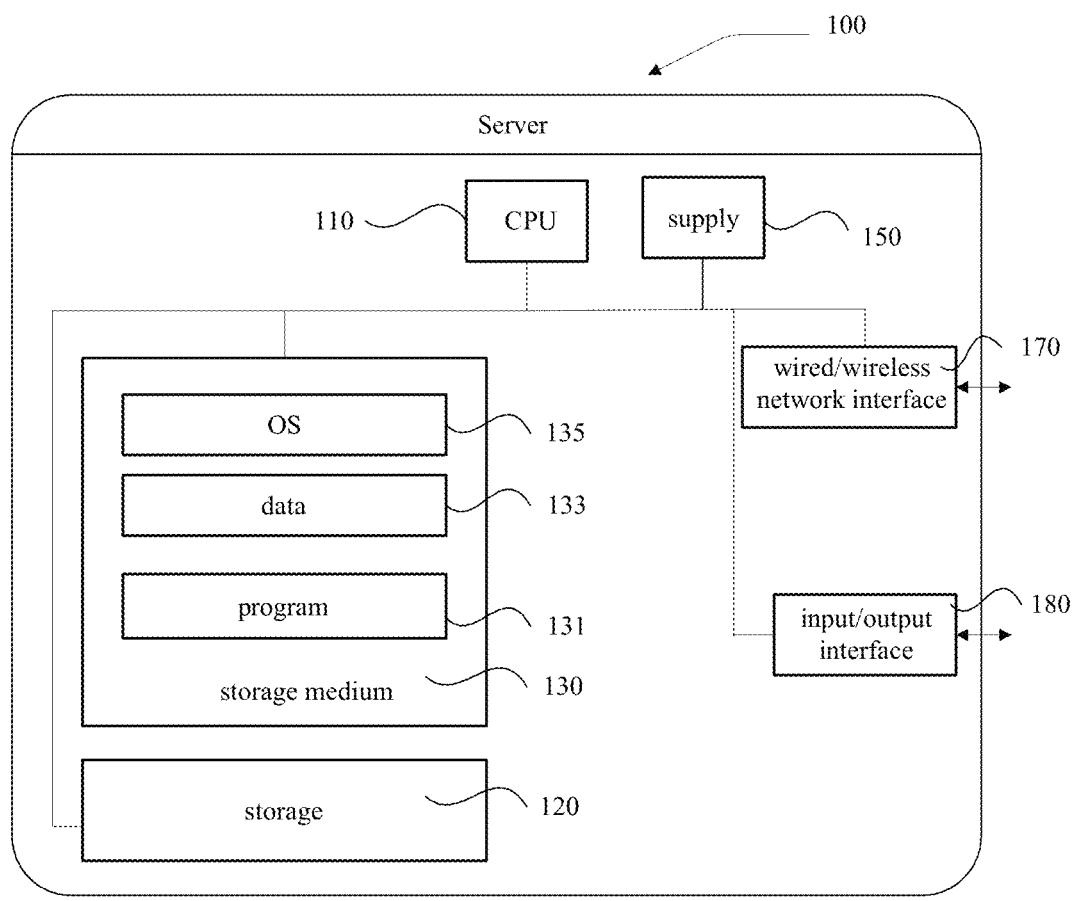
FIG. 1 is a diagram illustrating structure of a server in accordance with various embodiments of the present disclosure.

FIG. 1 is a diagram illustrating structure of a server in accordance with various embodiments of the present disclosure. The server 100 may differ a lot due to different configurations and performances, and may include one or more than one Central Processing Unit (CPU) 110, (such as, one or more than one processor), a storage 120, one or more than one storage programs 131, or a storage medium 130 of data 133 (such as one or more than one massive storage device). The storage 120 and the storage medium 130 may temporarily or permanently store the data. The programs stored in storage medium 130 may include one or more than one module (not shown in the figure). Each module may include a series of instruction operations of the server. Further, the CPU 110 may be configured to communicate with the storage medium 130 and execute the series of instruction operations in the storage medium 130. The server may further include one or more than one supply 150, one or more than one wired/wireless network interface 170, one or more than one input/output interface 180, and/or one or more than one Operating System (OS) 135, such as Windows Server™, Mac OS X™, Unix™, Linux™, FreeBSD™, etc. The following blocks executed by a server may be based on the structure of the server shown in FIG. 1.

In view of the above description, the server 100, which may be applied to embodiments of the present disclosure, may make a response to an index operation request of a file in a format of program instructions, to index stored files.

Further, embodiments of the present disclosure may also be implemented via a circuit or a circuit combined with software instructions. Therefore, embodiments of the present disclosure may not be limited to a specific circuit, software or combination thereof.

Figure 2:
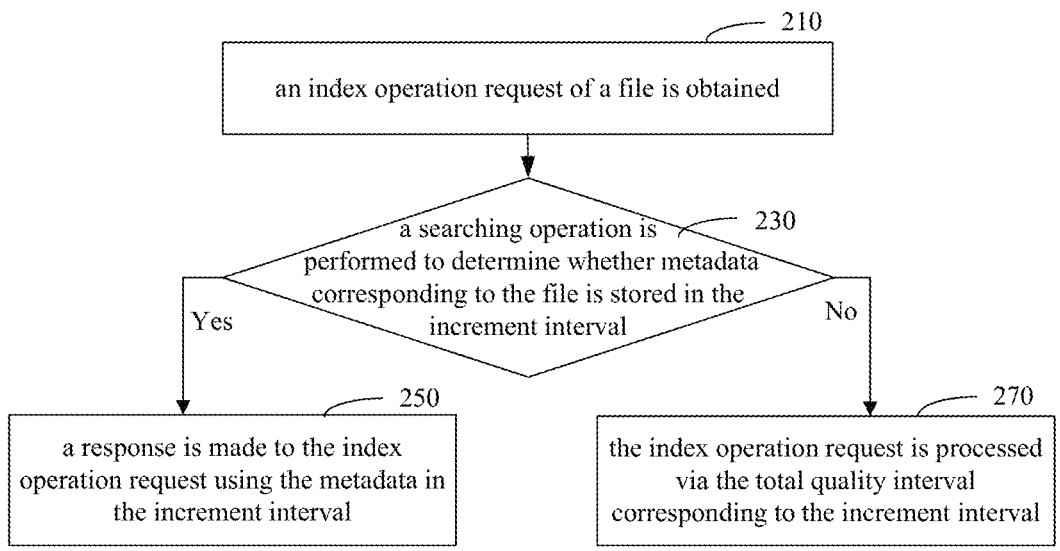
FIG. 2 is a flow chart illustrating an indexing implementing method in file storage in accordance with various embodiments of the present disclosure.

In an embodiment, specifically, the indexing implementing method in the file storage may be shown in FIG. 2 and include following blocks.

At block 210, an index operation request of a file requesting for indexing a file may be obtained.

This file may be a file that is to be stored, that is, a file that is to be stored in the distributed storage system, or any file that has been stored in the distributed storage system. The indexing operation of the file may correspond to operations of the file in the distributed storage system, and the indexing operation may be triggered according to needed file operations.

For instance, the file operations of the file in the distributed storage system may include: a write operation, a read operation, a deletion operation, etc., to write, read or delete a file. Accordingly, the index operation of a file may include creating, obtaining and deleting the file.

Since massive files are stored and new files are being written in, there may be massive client devices that may perform a file operation for a file and file index operation requests from the client devices may be continuously received.

At block 230, a searching operation may be performed to determine whether metadata corresponding to the file is stored in the increment interval. When the metadata corresponding to the file is stored in the increment interval, block 250 may be performed; otherwise, block 270 may be performed.

In an embodiment, the metadata and increment interval for storing the metadata may be implemented in a metadata cluster or other devices. The metadata cluster may be used to store the metadata and provide a metadata storage service.

Any metadata may include: indexes corresponding to a file and related attributes. The metadata may be distinguished via a file ID, e.g., a key. The metadata storage service may be a program, which may provide services based on the metadata, and may provide a data adding, deletion, searching or modifying interface, which may be called when making a response to an index operation request.

In the metadata cluster, a key interval may be divided into an increment interval and a total quality interval. The increment interval and total quality interval may store multiple pieces of metadata. In an embodiment, data stored in the increment interval may be less than that stored in the total quality interval.

With regard to a stored file, no matter whether the stored file is obtained or deleted, the client device may initiate an index operation request for the file. The index operation request may be an index obtaining request or an index deletion request.

After the index operation request is obtained, the searching operation may be performed in the increment interval, in which the metadata may be stored. When the increment interval stores the corresponding metadata, a response may be made to the index operation request using the metadata.

Since the increment interval may store relative less data, the performance of the searching operation performed in the increment interval may be high, which may reduce delay caused by the searching operation.

At block 250, a response may be made to the index operation request using the metadata in the increment interval.

After the metadata corresponding to the index operation request may be obtained via the searching operation performed for the increment interval, the index operation may be performed for the metadata and a processing result may be returned to the client device to finish the response to the index operation request. That is, the method of making a response to the index operation request according to at least one piece of metadata in the increment interval may include: performing an index operation for the at least one piece of metadata in the increment interval.

At block 270, the index operation request may be processed via the total quality interval corresponding to the increment interval.

When the metadata corresponding to index operation request is not found in the increment interval, it may indicate that the metadata may be stored in the total quality interval. Therefore, the processing of the index operation request may be performed in the total quality interval. That is, the method of processing the index operation request according to a total quality interval corresponding to the increment interval may include: performing an index operation for the at least one piece of metadata in the total quality interval corresponding to the increment interval.

That is, the metadata cluster, as a data center of a distributed storage system, may store and manage the indexes. The architecture of the storage service may be as follows.

In the metadata cluster, the key interval may be divided into the increment interval and the total quality interval. After obtaining the index operation request for a file, the key interval may be determined according to the file ID. In the determined key interval, first, the searching operation may be performed in the increment interval. When the corresponding metadata cannot be found from the increment interval, the searching operation may be performed in the total quality interval. When the metadata can be found from the increment interval, many computer resources may be saved and high reliability of the storage of the massive data may be ensured.

In an embodiment, the above index operation request may include an index obtaining request, and the block 250 may include following processing.

The metadata may be extracted from the metadata corresponding to the file found from the increment interval according to a write time stamp, e.g. the time stamp that the metadata is written in the increment interval, and the extracted metadata may be issued.

The metadata may include indexes corresponding to the file and related attributes. The attributes may include a time stamp corresponding to an operation performed for the index, such as the write time stamp stamped when the metadata is written in the increment interval.

According to the write time stamp, the metadata not only may be distinguished via the file ID, but also may be distinguished by the time stamp. Therefore, a same file may correspond to multiple pieces of metadata, may be stored in the increment interval or total quality interval, or may be stored in the increment interval and the total quality interval. The metadata may have a same file ID and write time stamps of the metadata may be different.

In an embodiment, the write stamp of each metadata in the multiple pieces of metadata corresponding to the file found from the increment interval may be compared to extract the metadata with the latest time stamp and the metadata with the latest time stamp may be issued.

Figure 3:
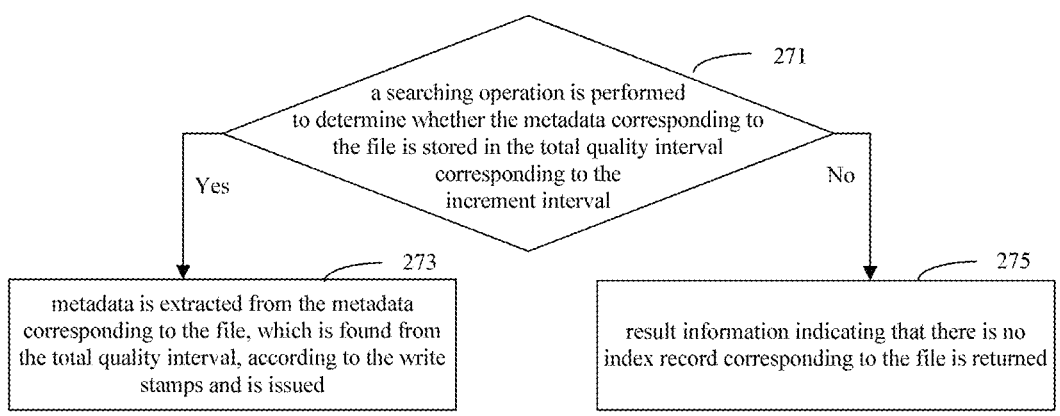
FIG. 3 is a flow chart illustrating a method for processing an index operation request initiated for a total quality interval corresponding to an increment interval in accordance with various embodiments of the present disclosure.
Figure 4:
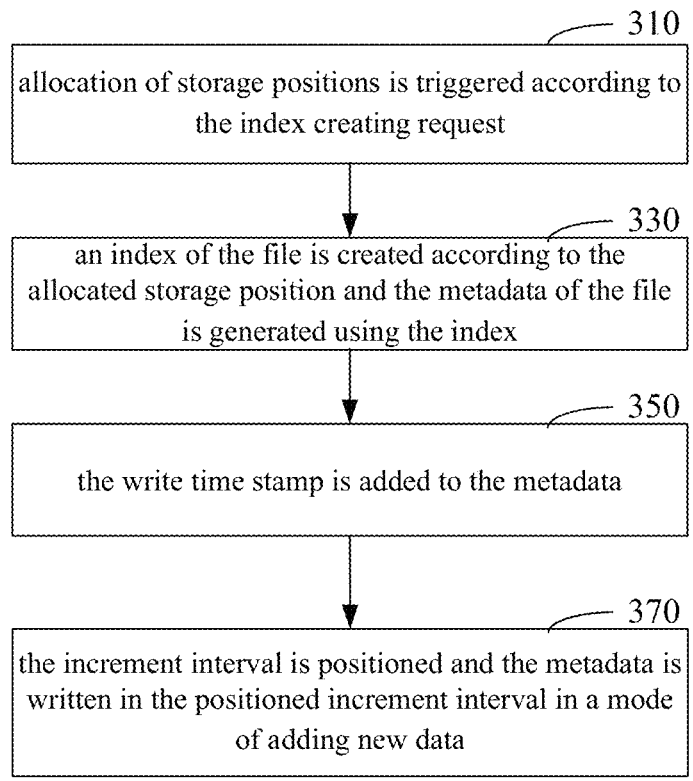
FIG. 4 is a flow chart illustrating an index implementing method in file storage in accordance with various embodiments of the present disclosure.

Further, in this embodiment, as shown in FIG. 3, the block 270 may include following blocks.

At block 271, a searching operation may be performed to determine whether the metadata corresponding to the file is stored in the total quality interval corresponding to the increment interval. When the metadata corresponding to the file is stored in the total quality interval corresponding to the increment interval, block 273 may be executed; otherwise, block 275 may be executed.

When the metadata is not found in the increment interval, the metadata may be searched in the total quality interval corresponding to the increment interval.

Specifically, the total quality interval may be searched to find the metadata including the file ID according to the file ID in the index operation request. The found metadata may be that corresponding to the file.

At block 273, metadata may be extracted from the metadata corresponding to the file, which may be found from the total quality interval, according to the write stamps and may be issued.

Each metadata may have a corresponding time stamp. Therefore, the metadata corresponding to the latest time stamp may be extracted according to the write time stamp.

At block 275, result information indicating that there is no index record corresponding to the file may be returned.

When no metadata is found from the total quality interval, the result information may be returned to the client device, which may have initiated the index operation request.

In an embodiment, the above index operation request may include an index deletion request, and the block 250 may include following processing.

An indexing deletion operation may be marked in the metadata stored in the increment interval according to the index deletion request of the file and a deletion time stamp may corresponding to the index deletion operation may be added.

Before the deletion operation is performed for the stored file, the deletion operation of the index may be performed first. Therefore, the client device may first initiate the index deletion request to the metadata cluster.

With regard to the metadata cluster, the index deletion request may be obtained, the corresponding metadata may be found from the increment interval. The metadata may be marked as deletion according to the index deletion request of the file, e.g. an operation of making the index with deletion, instead of deleting the metadata, and the deletion time stamp may be added to the attributes of the metadata.

With the above indexing deletion process, the metadata of the current version may be stored as history data to avoid of the loss of the metadata of the current version. Therefore, after the stored file is deleted, the user still may obtain the deleted file in a subsequent fallback operation.

In an embodiment, the above index operation request may include: an index creating request. After the block 210, the above method may further include following blocks.

At block 310, allocation of storage positions may be triggered according to the index creating request.

The index creating request may include a file ID and the file ID may correspond to a file that is currently to be written in. When any client device writes a file in the distributed storage system, an index may need to be created for the file first.

Specifically, the client device may initiate the index creating request to the metadata cluster. Accordingly, after receiving the index creating request initiated by the client device, the server may trigger an operation of allocating storage position for the file, which is to be written in the storage position. The storage position may be the physical position, in which the file may be stored.

Figure 5:
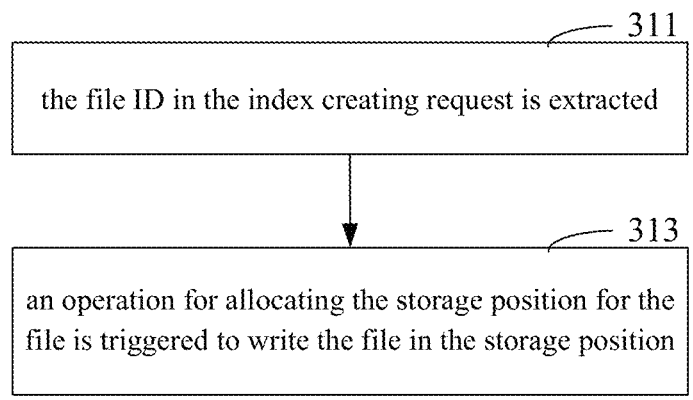
FIG. 5 is a flow chart illustrating a method for allocating storage locations according to an index creating request in accordance with various embodiments of the present disclosure.

As the storage position is allocated, the file, which is currently to be written, may be stored according to the storage position. Further, in this embodiment, as shown in FIG. 5, the block 310 may include following blocks.

At block 311, the file ID in the index creating request may be extracted.

At block 313, an operation for allocating the storage position for the file may be triggered to write the file in the storage position.

At block 330, an index of the file may be created according to the allocated storage position and the metadata of the file may be generated using the index.

The index in the metadata may be a mapping relationship between the file ID and the storage position. As mentioned above, any piece of metadata may include the index corresponding to the file and related attributes. Therefore, in a process of creating an index for a file, which is written in, the index of the metadata may be generated using the file ID and the storage position and the attributes of the metadata may be generated by adding the time stamp.

Specifically, the process for generating the metadata of the file using the storage position may include: creating a mapping relationship between the file ID and the allocated storage position and generating the metadata of the file taking the mapping relationship as the index.

One or multiple storage positions may be allocated to back up the file using the multiple storage positions.

At block 350, the write time stamp may be added to the metadata.

At block 370, the increment interval may be positioned and the metadata may be written in the positioned increment interval in a mode of adding new data.

The specific process for positioning the increment interval may include: obtaining the key interval corresponding to the metadata cluster according to the file ID in the index creating request. The increment interval in the key interval may be that created for the current indexing.

The format for writing the new data may be an append format, rather than an overwrite format to retain history data and different versions of a same file may be tracked.

Figure 6:
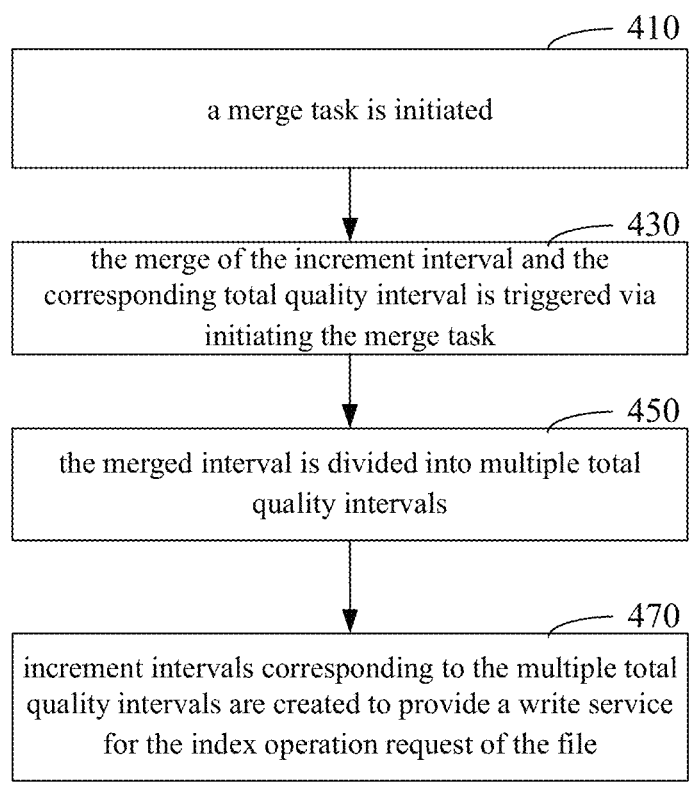
FIG. 6 is a flow chart illustrating an indexing implementing method in file storage in accordance with various embodiments of present disclosure.

In another embodiment, as shown in FIG. 6, the above method may further include following blocks.

At block 410, a merge task may be initiated.

The merge task may refer to merge the metadata in the increment interval and the corresponding total quality interval. When a merge operation is triggered, the merge task may be initiated. Actions of the existing increment interval and the corresponding total quality interval may be merged via the merge operation to implement the merger task. The merge operation may be an off-line operation.

At block 430, the merge of the increment interval and the corresponding total quality interval may be triggered via initiating the merge task.

The new metadata may be written in the increment interval in a mode of adding new data. With regard to the deletion of the metadata in the data cluster, a corresponding mark may be added to the increment interval. Therefore, the metadata in the total quality interval may not be modified and only the metadata in the increment interval may be modified.

The total quality interval may be used to record the history data of the metadata, the increment interval may be used to store new metadata and metadata may be deleted from the increment interval. The total quality interval and the increment interval may be searched to respectively find the history data and the new metadata.

With the write of the new file, the metadata in the increment interval continues to crease. Therefore, the intervals may need to be dynamically adjusted to ensure that data in the increment interval is less than that in the total quality interval and ensure the read and write performance of the indexes in the increment interval.

The process for dynamically adjusting the intervals may include: merging the existing increment interval and total quality interval and creating a new increment interval.

At block 450, the merged interval may be divided into multiple total quality intervals.

The segment obtained by merging the existing increment interval and the corresponding total quality interval may include a large amount of metadata. The amount of the data is very large, the segment may need to be divided to obtain multiple total quality intervals and ensure storage efficiency and indexing operation efficiency of the metadata of the total quality interval.

At block 470, increment intervals corresponding to the multiple total quality intervals may be created to provide a write service for the index operation request of the file.

Each total quality interval may have a corresponding increment interval. Therefore, when a partition operation is performed for the total quality interval, an increment interval may need to be created for each segment obtained by the partition operation.

In the subsequent file write operation, the index may be created and written in the newly-created increment interval. That is, the new increment interval may be created and the corresponding metadata may be written in the new increment interval.

With the above process, the dynamic adjustment of the segments may be implemented via the merge task. Therefore, the increment interval and total quality interval set in the metadata cluster may be adapted to the quantity of the metadata, which may improve the reliability of related storage services such as storage of the metadata, adding, deletion, searching and modification of the index.

Figure 7:
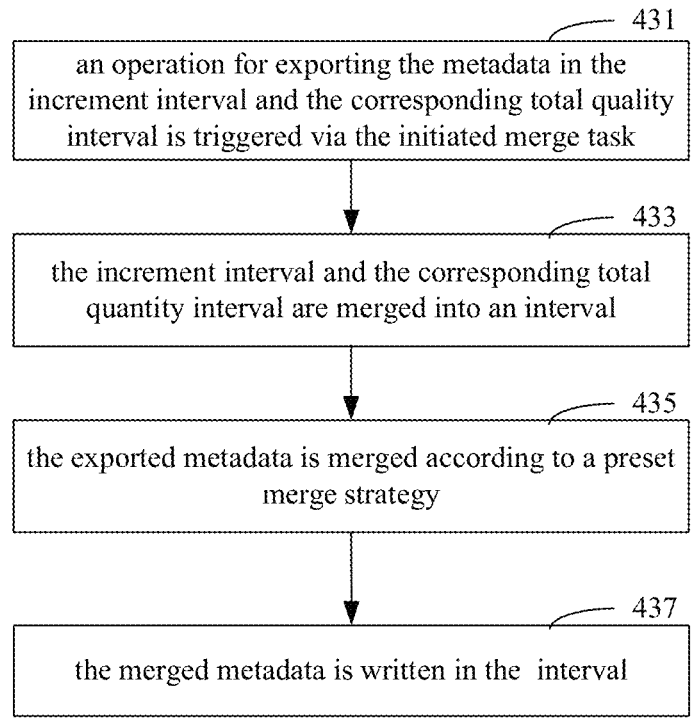
FIG. 7 is a flow chart illustrating a method for triggering merge of the increment interval and the total quality interval via initiating a merge task in accordance with various embodiments of the present disclosure.

Further, in this embodiment, as shown in FIG. 7, the block 430 may include following blocks.

At block 431, an operation for exporting the metadata in the increment interval and the corresponding total quality interval may be triggered via the initiated merge task.

When the merge task is initiated, the metadata, which may have been written in before this time point, may be merged and metadata, which may be written after this time point, may be written in the new increment interval. Therefore, the operation for exporting the metadata in the increment interval and the corresponding total quality interval may be triggered via the initiated merge task. The export process and the merge process may be performed in a distributed mode, e.g., in an asynchronous mode.

At block 433, the increment interval and the corresponding total quantity interval may be merged into an interval.

At block 435, the metadata may be exported according to a preset merge strategy.

The preset merge strategy may include: (1) whether to delete the metadata, which may have been marked as delete; (2) whether to merge the metadata with the same file ID and different time stamps; (3) size of each segment, that may be obtained by partitioning the segment obtained by the merge operation. The merge strategy that may be used to merge the metadata may be any of the above strategies, or combination of several strategies, which may be determined according as required and may be flexible.

Further, the block 435 may include: the metadata, which may have be marked as deletion may be deleted from the exported metadata to implement the merge strategy of deleting the metadata, which may have been marked as deletion.

At block 437, the merged metadata may be written in the interval.

The indexing implementing method in the above file storage may be described in detail accompanying with a specific embodiment. In this embodiment, as shown in FIG. 8, in practice, the storage service of the metadata may be implemented via the increment interval (called Delta) and the total quality interval (called Snapshot) corresponding to the increment interval.

Figure 8:
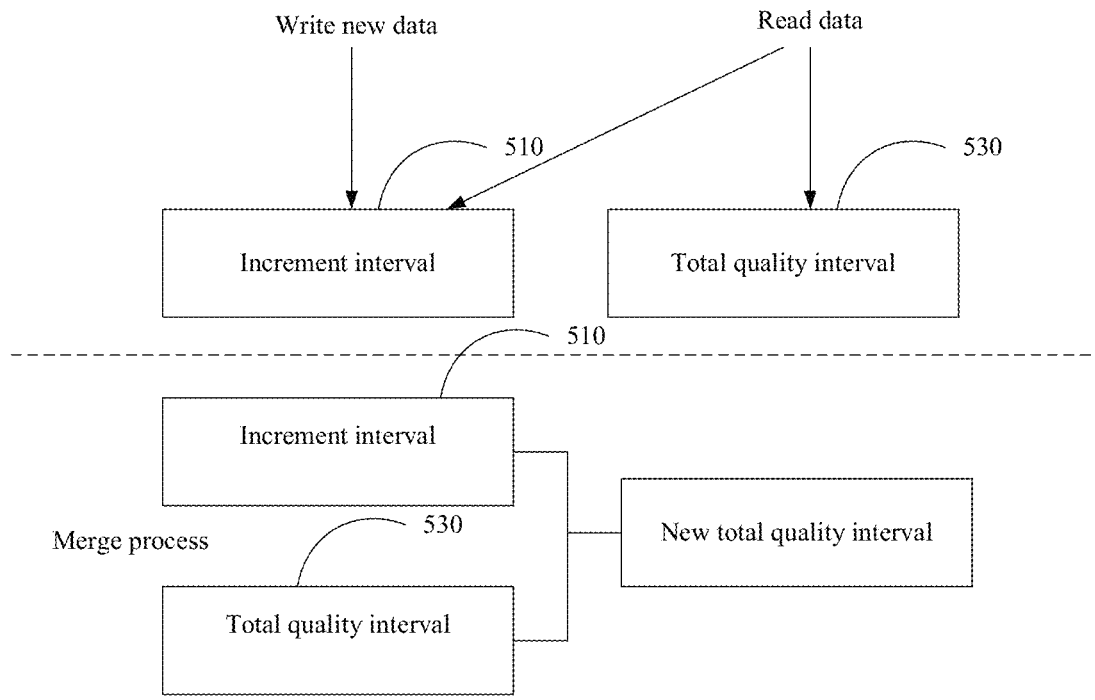
FIG. 8 is a diagram illustrating a metadata storage service in accordance with various embodiments of the present disclosure.

The accessing of the metadata may be classified into two types, e.g. accessing Delta and accessing Snapshot, that is, the accessing of the metadata may be the data reading process shown in FIG. 8.

The blocks shown in FIG. 8 may clearly display that data in the Delta may be much less than that in the Snapshot. The write of the new data, that is the creation of the index may be performed for the Delta.

Figure 9:
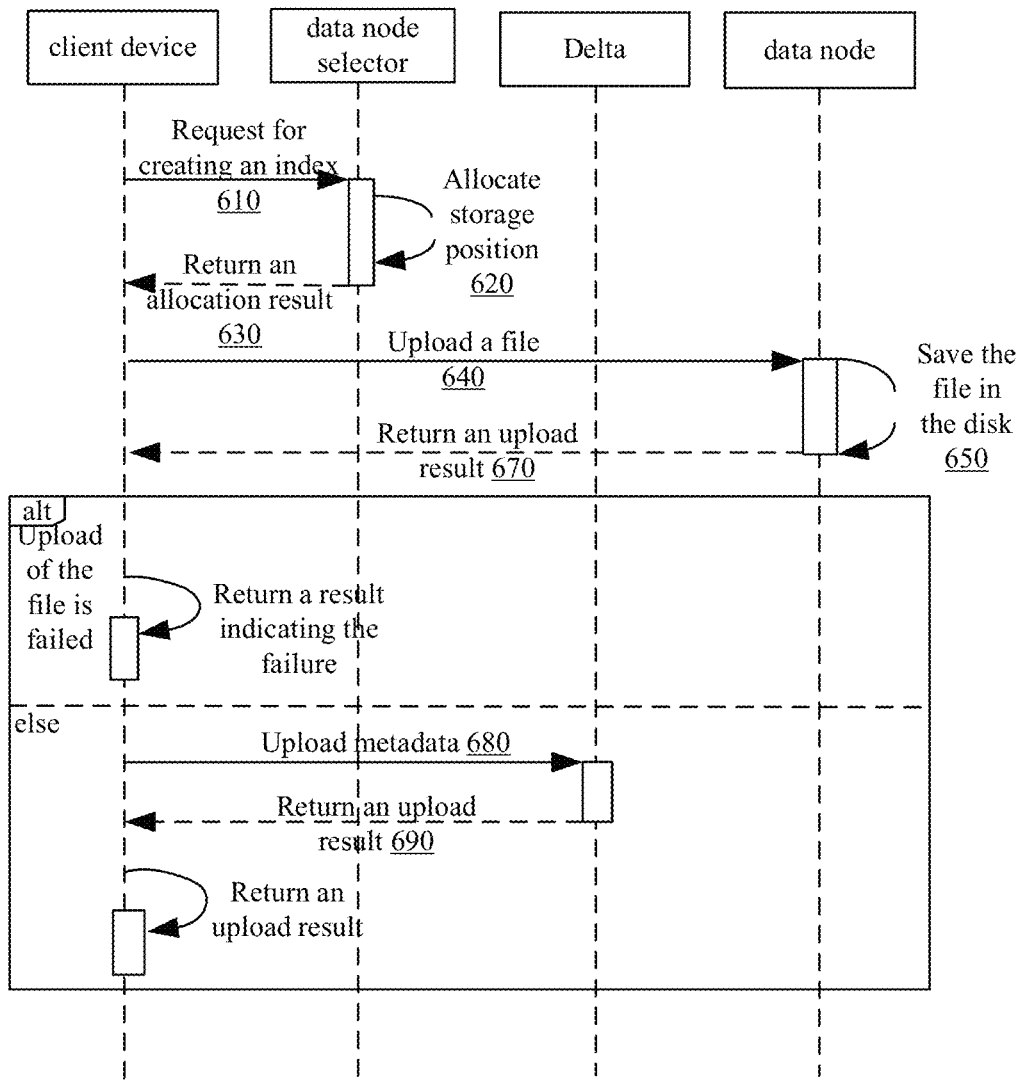
FIG. 9 is a sequence diagram of index creation in accordance with various embodiments of the present disclosure.

Accompanying FIG. 9, when the client device initiates the indexing creating request to a data node selector, the data node selector may trigger an operation of allocating storage positions. At block 610, the client device may send a request for creating an index to the data node selector. At block 620, the data node selector may allocate a storage position. That is, block 620 may be executed to return an allocation result to the client device, e.g. the block 630.

The client device may upload the file to the data node at block 640 corresponding to the storage position to execute the block 650. At block 650, in this data node, the file may be stored in the disk.

The client device may receive an upload result returned by the data node at block 670 to obtain whether the file may have been successively uploaded. When the file is successively uploaded, the metadata may be generated according to the file ID and the allocated storage position, and the upload operation of the metadata may be further executed at block 680 to write the metadata in the Delta and create the index corresponding to the file. At block 690, the Delta may return an upload result to the client device.

It should be noted that the data node selector in this embodiment may be a program in the metadata cluster, which may be used to provide services, while the data node may be a computer in the distributed storage system, which may be used to provide a storage medium.

Figure 10:
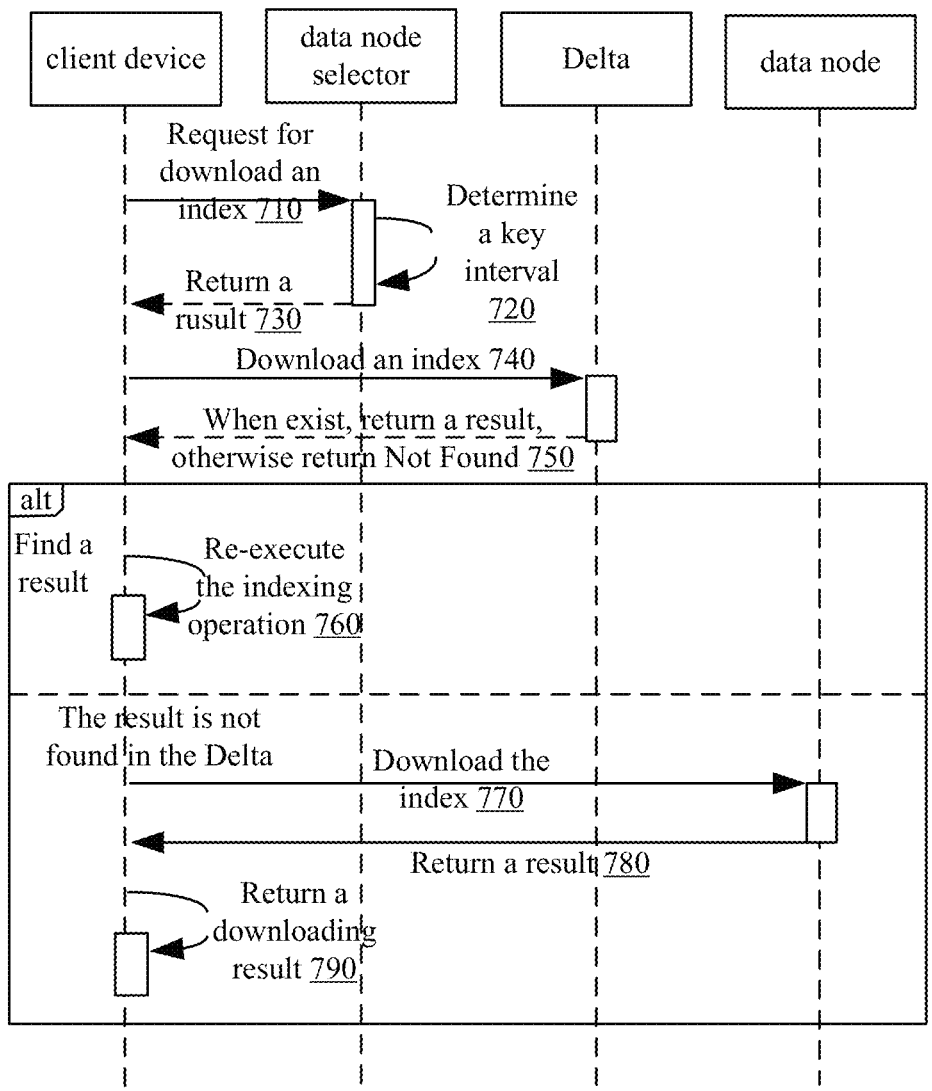
FIG. 10 is a sequence diagram illustrating index obtaining in accordance with various embodiments of the present disclosure.

After the creation of the index is finished, refer to FIG. 10, the client device may obtain the index via the interaction between the client device and the data selector.

Specifically, the client device may execute the block 710, initiate an index obtaining request to the data node selector to request for downloading the index. At block 720, the data node selector may determine the key interval, at which the index may be located, according to the file ID in the index obtaining request. At block 730, the data node selector may return a result to the client device.

The client device may first download the index from the Delta of the key interval at block 740, to search the Delta to determine whether the metadata including the index is stored in the Delta and return a corresponding search result.

According to the search result, when the metadata including the index is found from the Delta, the client device may directly download the index from the Delta at block 750; when the metadata including the index is not found from the Delta, the client device may receive "Not Found" from the Delta at block 750. At block 760, the client device may re-execute the indexing operation.

When the metadata including the index is not found from the Delta, the index may be downloaded from the corresponding Snapshot, that is blocks 770 to block 790 may be executed to download the metadata from the data node, receive a result from the data node and return a downloading result.

On the other hand, with regard to the created and stored index, when the file is deleted, the index may be accordingly deleted.

Figure 11:
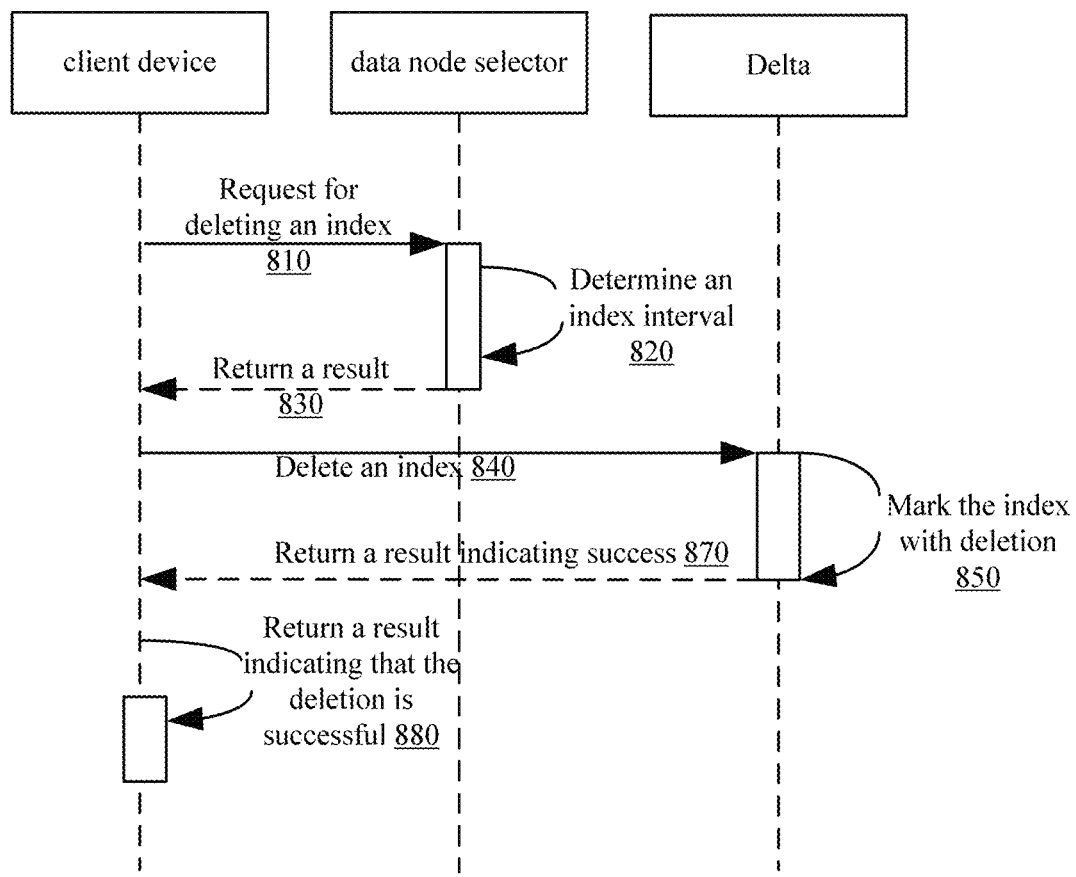
FIG. 11 is a sequence diagram illustrating index deletion in accordance with various embodiments of the present disclosure.
Figure 12:
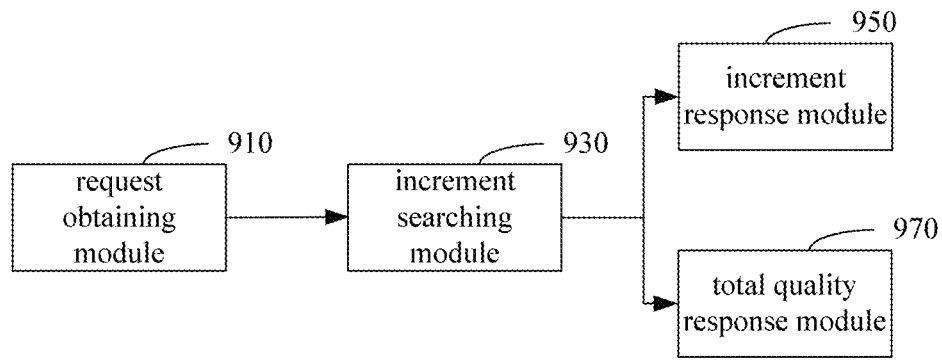
FIG. 12 is a diagram illustrating structure of an indexing implementing system in file storage in accordance with various embodiments of the present disclosure.

As shown in FIG. 11, during the deletion process of the file, the client device may initiate an index deletion request requesting for deleting an index to the data node selector at block 810. The data node selector may execute the block 820 to determine that the metadata including the index may be stored in the Delta, e.g., to determine the index interval, return a result to the client device at block 830. The Delta may receive a request for deleting an index from the client device at block 840, and delete the index in the metadata, that is block 850 may be executed, and the data node selector may notify the client device that the index may have been successively deleted at block 870. The client device may return a result indicating that the deletion is successful at block 880.

As the metadata is written in the Delta and the metadata in the Delta is noted as delete, refer to the merge process shown in FIG. 8, the Delta and the Snapshot may be merged as a new Snapshot to create a new Delta corresponding to the new Snapshot and implement dynamic adjustment of the segment.

An embodiment of the present disclosure may further provide an indexing implementing system in file storage, including: a request obtaining module 910, an increment searching module 930, an increment response module 950 and a total quality response module 970.

The request obtaining module 910 may be to obtain an index operation request of a file.

The increment searching module 930 may be to search an increment interval to determine whether the increment interval stores at least one piece of metadata corresponding to the file, notify the increment response module 950 when the increment interval stores the at least one piece of metadata corresponding to the file, and notify the total quality response module 970 when the increment interval does not store metadata corresponding to the file.

The increment response module 950 may be to make a response to the index operation request according to the at least one piece of metadata in the increment interval.

The total quality response module 970 may be to process the index operation request according to a total quality interval corresponding to the increment interval.

Each piece of metadata may include: an index corresponding to the file.

In an embodiment, the index operation request may include: an index obtaining request, the increment response module 950 may be further to extract the metadata according to a write time stamp of each of the at least one piece of metadata corresponding to the file, which may be found from the increment interval, and issue the metadata.

In an embodiment, the increment response module 950 may be further to extract metadata with a latest write time stamp according to a write time stamp of each of the at least one piece of metadata corresponding to the file, which is found from the increment interval, and issue the metadata.

Figure 13:
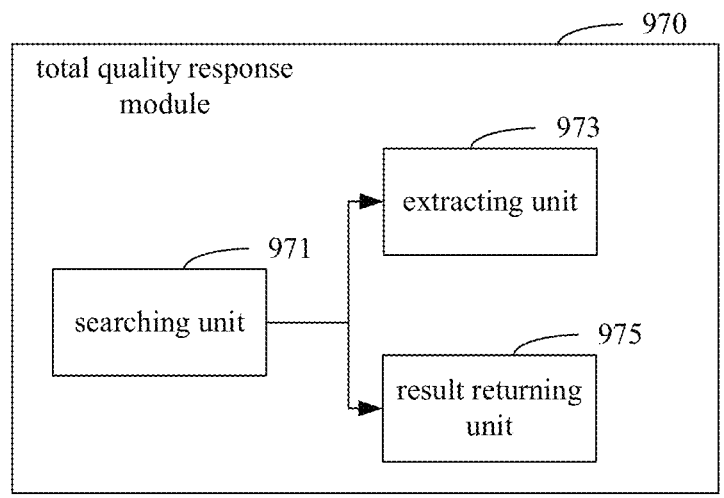
FIG. 13 is a diagram illustrating structure of a total quality response module in accordance with various embodiments of the present disclosure.

In an embodiment, as shown in FIG. 13, the total quality response module 970 may include: a searching unit 971, an extracting unit 973, and a result returning unit 975.

The searching unit 971 may be to search the total quality interval corresponding to the increment interval to determine whether the total quality interval comprises at least one piece of metadata corresponding to the file; when the total quality interval comprises the at least one piece of metadata corresponding to the file, notify an extracting unit 973, when the total quality interval comprises does comprise any piece of metadata corresponding to the file, notify the result returning unit 975;

the extracting unit 973 may be to extract the metadata according to a write time stamp of each of the at least one piece of metadata corresponding to the file, which is found from the total quality interval, and issue the metadata.

In an embodiment, the extracting unit 973 may be further to extract the metadata with the latest write time stamp according to a write time stamp of each of the at least one piece of metadata corresponding to the file, which is found from the total quality interval.

The result returning unit 975 may be to return result information indicating that there is no index record corresponding to the file.

In an embodiment, the index operation request may include: an index deletion request, the increment response module 950 may be further to perform an index deletion operation of marking an index in at least one piece of metadata in the increment interval with deletion according to the index deletion request and add a deletion time stamp corresponding to the index deletion operation.

Figure 14:
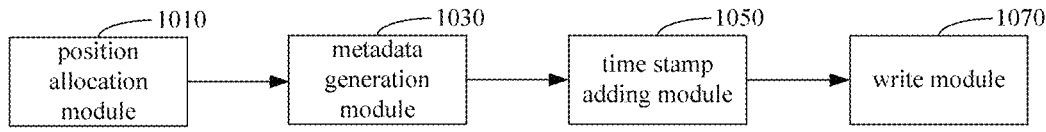
FIG. 14 is a diagram illustrating structure of an indexing implementing system in file storage in accordance with various embodiments of the present disclosure.

In an embodiment, the index operation request may include: an index creation request, as shown in FIG. 14, the system may include: a position allocation module 1010, a metadata generation module 1030, time stamp adding module 1050 and a write module 1070.

The position allocation module 1010 may be to trigger allocation of a storage position according to the index creation request.

The metadata generation module 1030 may be to create an index of the file according to a storage position, and generate the metadata using the index.

The time stamp adding module 1050 may be to add a write time stamp in the metadata.

The write module may be to position the increment interval, and write the metadata into the positioned increment interval in a mode of adding new data.

Figure 15:
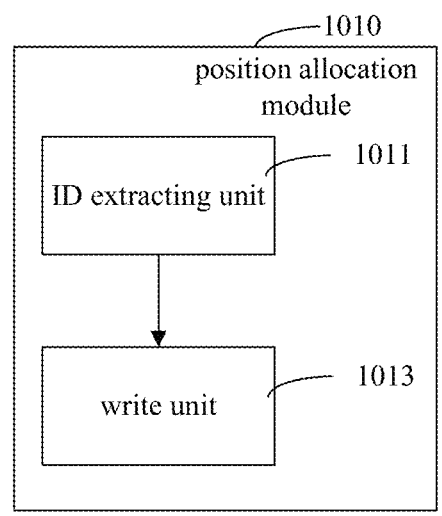
FIG. 15 is a diagram illustrating structure of a location allocation module in accordance with various embodiments of the present disclosure.

Further, in an embodiment, as shown in FIG. 15, the position allocation module 1010 may include:

an ID extracting unit 1011, to extract a file ID from the index creation request; and a write unit 1013, to trigger an operation of allocating the storage position of the file, so that the file is written in the storage position.

Further, the metadata generation module 1030 may be further to create a mapping relationship between the file ID and the storage position and generate the metadata of the file taking the mapping relationship as the index.

Figure 16:
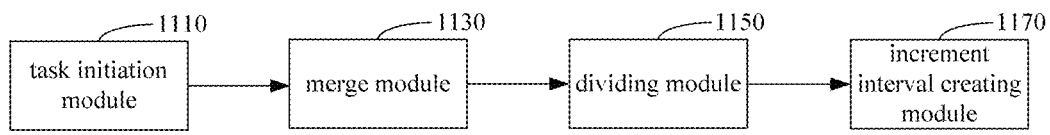
FIG. 16 is a diagram illustrating structure of an indexing implementing system in file storage in accordance with various embodiments of the present disclosure.

In an embodiment, as shown in FIG. 16, the above system may further include: a task initiation module 1110, a merge module 1130, a dividing module 1150, and an increment interval creating module 1170.

The task initiation module may be to initiate a merge task.

The merge module 1130 may be to trigger merge of the increment interval and total quality interval via the merge task.

The dividing module 1150 may be to divide the merged interval into multiple total quality intervals.

The increment interval creating module 1170 may be to create multiple increment intervals respectively corresponding to the multiple total quality intervals to provide a write service for the index operation request of the file.

Figure 17:
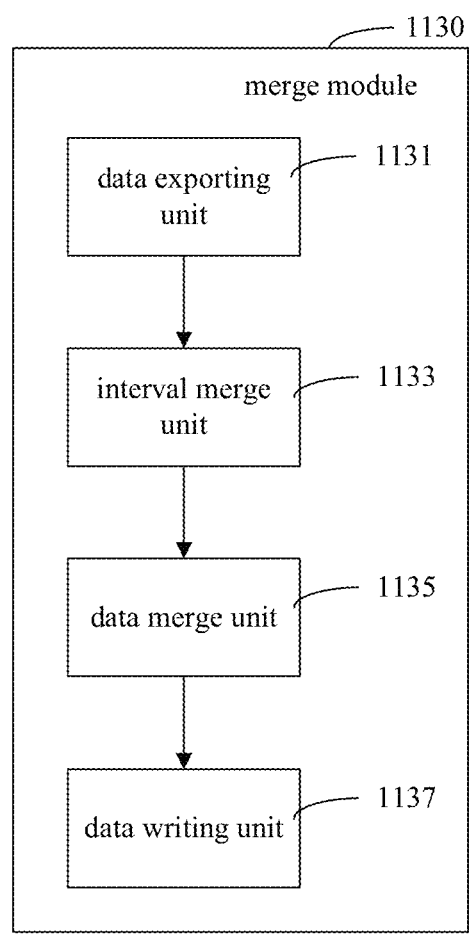
FIG. 17 is a diagram illustrating structure of a merge module in accordance with various embodiments of the present disclosure.

In an embodiment, as shown in FIG. 17, the merge module 1130 may include: a data exporting unit 1131, an interval merge unit 1133, a data merge unit 1135 and a data writing unit 1137.

The data exporting unit 1131 may be to trigger an operation of exporting metadata in the increment interval and the corresponding total quality interval via the merge task.

The interval merge unit 1133 may be to merge the increment interval and the corresponding total quality interval into one merged interval.

The data merge unit 1135 may be to merge the exported metadata according to a preset merge strategy.

In an embodiment, the data merge unit 1135 may be further to delete metadata, index which is marked with deletion, from the exported metadata.

The data writing unit 1137 may be to write the merged metadata in the interval.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A data accessing method in file storage, carried out by a server, comprising:

dividing a key interval into an increment interval and a total quality interval in a metadata cluster used for storing metadata and providing a metadata storage service, wherein data stored in the increment interval is less than that stored in the total quality interval;

obtaining an index operation request of a file, wherein the file is to be stored in a distributed storage system, or the file has been stored in the distributed storage system;

searching the increment interval to determine whether the increment interval stores at least one piece of metadata corresponding to the file;

making a response to the index operation request according to the at least one piece of metadata in the increment interval when the increment interval stores the at least one piece of metadata corresponding to the file;

processing the index operation request according to the total quality interval corresponding to the increment interval when the increment interval does not store the at least one piece of metadata corresponding to the file;

wherein each piece of metadata comprises an index corresponding to the file;

initiating a merge task;

triggering merge of the increment interval and total quality interval via the merge task to generate one merged interval;

dividing the one merged interval into multiple total quality intervals;

creating multiple increment intervals respectively corresponding to the multiple total quality intervals to provide a write service for the index operation request of the file;

wherein triggering the merge of the increment interval and total quality interval via the merge task to generate one merged interval comprises:

triggering an operation of exporting metadata in the multiple increment intervals and the corresponding multiple total quality intervals via the merge task;

merging the multiple increment intervals and the corresponding multiple total quality intervals into the one merged interval;

merging the exported metadata according to a preset merge strategy; and writing the merged exported metadata in the one merged interval, wherein the key interval corresponds to the metadata cluster associated with the file in the index operation request.

2. The method according to claim 1, wherein the index operation request comprises: an index obtaining request, making a response to the index operation request according to the at least one piece of metadata in the increment interval comprises:

extracting metadata with latest write time stamp according to a write time stamp of each piece of metadata corresponding to the file, which is found from the increment interval; and issuing extracted metadata.

3. The method according to claim 2, wherein processing the index operation request according to the total quality interval corresponding to the increment interval comprises:

searching the total quality interval corresponding to the increment interval to determine whether the total quality interval comprises the at least one piece of metadata corresponding to the file; when the total quality interval comprises the at least one piece of metadata corresponding to the file, extracting metadata with latest write time stamp according to a write time stamp of each piece of metadata corresponding to the file, which is found from the total quality interval, and issuing extracted metadata.

4. The method according to claim 1, wherein the index operation request comprises: an index deletion request, making a response to the index operation request according to the at least one piece of metadata in the increment interval comprises:

performing an index deletion operation of marking an index in at least one piece of metadata in the increment interval with deletion according to the index deletion request and adding a deletion time stamp corresponding to the index deletion operation.

5. The method according to claim 1, wherein the index operation request comprises: an index creation request, after obtaining the index operation request, the method further comprises:

triggering allocation of a storage position according to the index creation request;

creating an index of the file according to the allocated storage position and generating the metadata of the file using the index;

adding a write time stamp to the metadata;

positioning the increment interval, and writing the metadata into the positioned increment interval in a mode of adding new data.

6. The method according to claim 5, wherein triggering the allocation of the storage position according to the index creation request comprises:

extracting a file Identity (ID) from the index creation request; and triggering the operation of allocating of the storage position of the file, so that the file is written in the storage position.

7. The method according to claim 6, wherein generating the metadata of the file using the allocated storage position comprises:

creating a mapping relationship between the file ID and the allocated storage position and generating the metadata of the file taking the mapping relationship as the index.

8. The method according to claim 1, wherein merging the exported metadata according to the preset merge strategy comprises:

deleting metadata, index of which is marked with deletion, from the exported metadata.

9. A data accessing system in file storage, comprising: a processor, which executes modules in a storage, wherein the modules comprise:

a dividing module, executed by the processor to divide a key interval into an increment interval and a total quality interval in a metadata cluster used for storing metadata and providing a metadata storage service, wherein data stored in the increment interval is less than that stored in the total quality interval;

a request obtaining module, executed by the processor to obtain an index operation request of a file, wherein the file is to be stored in a distributed storage system, or the file has been stored in the distributed storage system;

an increment searching module, executed by the processor to search the increment interval to determine whether the increment interval stores at least one piece of metadata corresponding to the file, notify an increment response module when the increment interval stores the at least one piece of metadata corresponding to the file, and notify a total quality response module when the increment interval does not store metadata corresponding to the file;

the increment response module is executed by the processor to make a response to the index operation request according to the at least one piece of metadata in the increment interval;
the total quality response module is executed by the processor to process the index operation request according to the total quality interval corresponding to the increment interval;
wherein each piece of metadata comprises an index corresponding to the file;
the modules further comprise:
a task initiation module, executed by the processor to initiate a merge task;
a merge module, executed by the processor to trigger merge of the increment interval and the total quality interval via the merge task to generate one merged interval;
a dividing module, executed by the processor to divide the one merged interval into multiple total quality intervals; and
an increment interval creating module, executed by the processor to create multiple increment intervals respectively corresponding to the multiple total quality intervals to provide a write service for the index operation request of the file;
wherein the merge module comprises:
a data exporting unit, executed by the processor to trigger an operation of exporting metadata in the multiple increment intervals and the corresponding multiple total quality intervals via the merge task;
an interval merge unit, executed by the processor to merge the multiple increment intervals and the corresponding multiple total quality intervals into the one merged interval;
a data merge unit, executed by the processor to merge the exported metadata according to a preset merge strategy; and
a data writing unit, executed by the processor to write the merged exported metadata in the one merged interval, wherein the key interval corresponds to the metadata cluster associated with the file in the index operation request.

10. The system according to claim 9, wherein the index operation request comprises: an index obtaining request, the increment response module is further executed by the processor to extract metadata with a latest write time stamp according to a write time stamp of each of the at least one piece of metadata corresponding the file, which is found from the increment interval, and issue the metadata.

11. The system according to claim 10, wherein the total quality response module comprises:
a searching unit, executed by the processor to search the total quality interval corresponding to the increment interval to determine whether the total quality interval comprises at least one piece of metadata corresponding to the file; when the total quality interval comprises the at least one piece of metadata corresponding to the file, notify an extracting unit;
the extracting unit is executed by the processor to extract metadata with a latest write time stamp according to a write time stamp of each of the at least one piece of metadata corresponding to the file, which is found from the total quality interval, and issue the metadata.

12. The system according to claim 9, wherein the index operation request comprises: an index deletion request, the increment response module is further executed by the processor to perform an index deletion operation of marking an index in at least one piece of metadata in the increment interval with deletion according to the index deletion request and add a deletion time stamp corresponding to the index deletion operation.

13. The system according to claim 9, wherein the index operation request comprises: an index creation request, the system further comprises: a position allocation module, executed by the processor to trigger allocation of a storage position according to the index creation request;
a metadata generation module, executed by the processor to create an index of the file according to a storage position, and generate the metadata using the index;
a time stamp adding module, executed by the processor to add a write time stamp in the metadata;
a write module, executed by the processor to position the increment interval, and write the metadata into the positioned increment interval in a mode of adding new data.

14. The system according to claim 13, wherein the position allocation module comprises:
an Identity (ID) extracting unit, executed by the processor to extract a file ID from the index creation request; and
a write unit, executed by the processor to trigger an operation of allocating the storage position of the file, so that the file is written in the storage position.

15. The system according to claim 14, wherein the metadata generation module is further executed by the processor to create a mapping relationship between the file ID and the storage position and generate the metadata of the file taking the mapping relationship as the index.

16. A non-transitory computer-readable medium storing instructions which, when executed by one or more processors, cause the one or more processors to:
divide a key interval into an increment interval and a total quality interval in a metadata cluster used for storing metadata and providing a metadata storage service, wherein data stored in the increment interval is less than that stored in the total quality interval;
obtain an index operation request of a file, wherein the file is to be stored in a distributed storage system, or the file has been stored in the distributed storage system;
search the increment interval to determine whether the increment interval stores at least one piece of metadata corresponding to the file;
make a response to the index operation request according to the at least one piece of metadata in the increment interval when the increment interval stores the at least one piece of metadata corresponding to the file; and
process the index operation request according to the total quality interval corresponding to the increment interval when the increment interval does not store the at least one piece of metadata corresponding to the file;
wherein each piece of metadata comprises an index corresponding to the file;
initiate a merge task;
trigger merge of the increment interval and total quality interval via the merge task to generate one merged interval;
divide the one merged interval into multiple total quality intervals;
create multiple increment intervals respectively corresponding to the multiple total quality intervals to provide a write service for the index operation request of the file;
wherein triggering the merge of the increment interval and total quality interval via the merge task to generate one merged interval comprises to:

trigger an operation of exporting metadata in the multiple increment intervals and the corresponding multiple total quality intervals via the merge task;

merge the multiple increment intervals and the corresponding multiple total quality intervals into the one merged interval;

merge the exported metadata according to a preset merge strategy; and write the merged exported metadata in the one merged interval, wherein the key interval corresponds to the metadata cluster associated with the file in the index operation request.

* * * * *